United States Patent [19]

O'Callaghan et al.

[11] Patent Number: 4,820,380

[45] Date of Patent: Apr. 11, 1989

[54] STABILIZED STARCH SUSPENSIONS

[75] Inventors: William O'Callaghan, Gerrards Cross; John W. Cruse, Robertsbridge, both of United Kingdom

[73] Assignee: P. T. Chemicals, Limited, Buckinghamshire, England

[21] Appl. No.: 795,259

[22] Filed: Nov. 5, 1985

Related U.S. Application Data

[62] Division of Ser. No. 689,048, filed as PCT GB 84/00141 on Apr. 25, 1984, abandoned.

[30] Foreign Application Priority Data

Apr. 25, 1983 [GB] United Kingdom ............... 8311152

[51] Int. Cl.$^4$ .............................................. D21H 1/34
[52] U.S. Cl. ................................. 162/135; 162/168.1; 162/175; 162/176; 162/177; 162/178
[58] Field of Search ............... 162/177, 175, 178, 176, 162/135, 168.1; 106/205, 208, 210, 213, 169, 197.1, 197.2; 427/395

[56] References Cited

U.S. PATENT DOCUMENTS

| | | | |
|---|---|---|---|
| 2,413,320 | 12/1946 | Griffin et al. | 162/178 |
| 2,627,477 | 2/1953 | Downey | 106/213 |
| 2,937,105 | 5/1960 | Cazemier et al. | 106/213 |
| 3,413,190 | 11/1968 | Aycock et al. | 162/175 |
| 3,692,552 | 9/1972 | Ruggeberg | 106/208 |
| 3,749,315 | 7/1973 | Crathern | 239/224 |
| 3,918,981 | 11/1975 | Long | 162/178 |
| 4,257,768 | 3/1981 | Racciato et al. | 106/208 |
| 4,257,816 | 3/1981 | Yin et al. | 106/208 |
| 4,363,669 | 12/1982 | Cottrell et al. | 106/208 |

FOREIGN PATENT DOCUMENTS

| | | |
|---|---|---|
| 704036 | 2/1965 | Canada . |
| 733296 | 5/1966 | Canada . |
| 0018086 | 10/1980 | European Pat. Off. . |
| 773732 | 5/1957 | United Kingdom . |
| 934638 | 8/1963 | United Kingdom . |
| 936662 | 9/1963 | United Kingdom . |
| 2016498 | 9/1979 | United Kingdom . |

OTHER PUBLICATIONS

Casey, *Pulp and Paper*, vol. III, (1981), pp. 1698-1703.

*Primary Examiner*—Peter Chin
*Attorney, Agent, or Firm*—Howson and Howson

[57] ABSTRACT

Aqueous suspensions of uncooked starch are stabilized by adding to the suspension a minor amount of a hydrophilic polymeric viscosity-increasing agent effective to prevent dilatancy and to increase the viscosity of the suspension so that settlement of starch particles during storage and transportation is substantially prevented. The hydrophilic polymeric viscosity-increasing agent is such that in a 0.5% by weight aqueous dispersion or solution thereof (based on the total weight of the dispersion or solution) at 20° C. the shear stress at a shear rate of 1.0 reciprocal second is greater than 5 dynes/cm$^2$ and the shear stress at a shear rate of 1000 reciprocal seconds is less than 250 dynes/cm$^2$. The preferred viscosity-increasing agent is xanthan gum and the suspension may also contain a water-soluble film-forming polymer. The suspensions find use in the manufacture of paper and board.

5 Claims, 3 Drawing Sheets

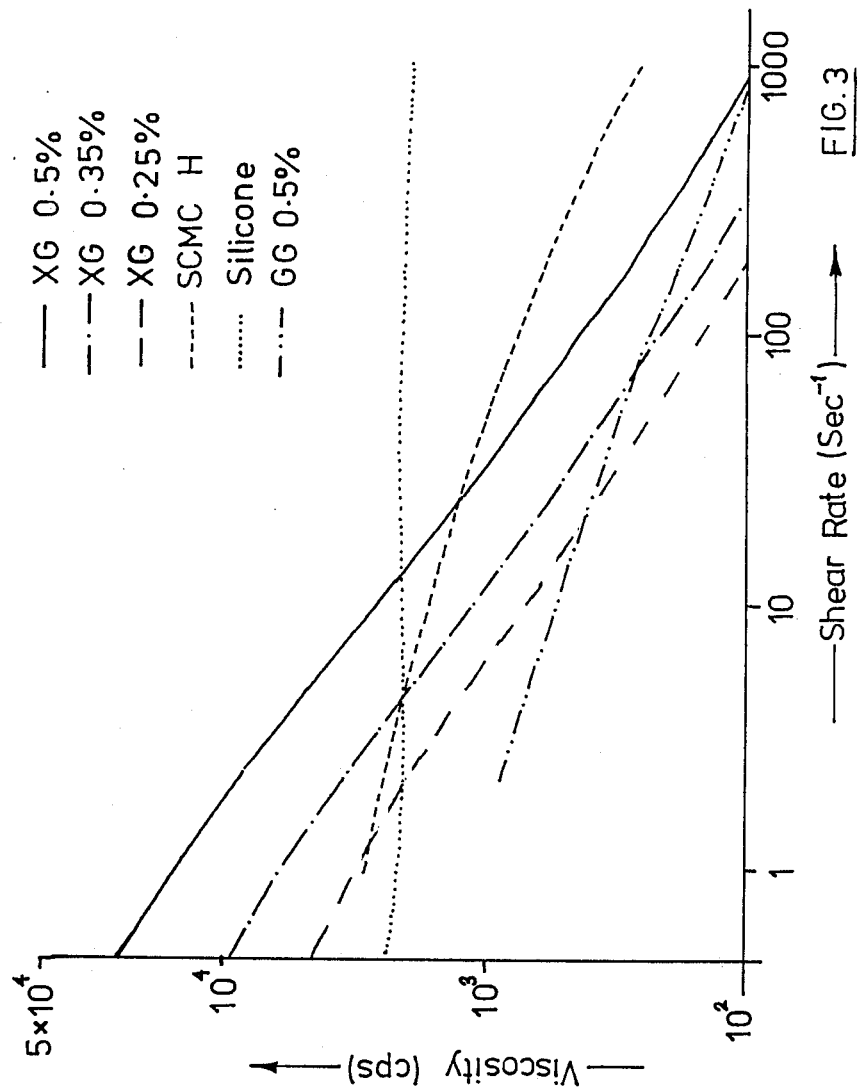

STABILIZED STARCH SUSPENSIONS

CROSS REFERENCES TO RELATED APPLICATIONS

This application is a division of application Ser. No. 689,048 filed Dec. 21, 1984 by the present applicants and entitled "Improvemments in paper and board manufacture" now abandoned. Application Ser. No. 689048 is the United States national conversion of International Application No. PCT/GB84/00141 (Publication No. WO 84/04315).

BACKGROUND OF THE INVENTION

Field of the Invention

This invention relates generally to the stabilisation of starch suspensions and more specifically to the use of stabilised starch suspensions in paper and board manufacture. Stabilised starch suspensions according to the invention can be stored for commercially useful periods of time and can also be pumped and supplied through pipes and ejected through nozzles without offering excessive resistance to such operations, thus enhancing the range of use of starch suspensions.

In the cereals-processing industry it is often the aim to produce protein-enriched products and the concomitant of such procedures is the production of residues in the form of starch suspensions. Hitherto, there have been difficulties in disposing of such suspensions economically. Drying off the suspensions to produce powdered starch is inordinately expensive, given present-day energy costs. In fact, Kirk-Othmer, "Encyclopedia of Chemical Technology", Third Edition, Volume 21 page 499, reports that "The large amounts of energy consumed in evaporating and drying starch make the wet-milling industry the second most energy-intensive food industry in the United States." To the knowledge of the present applicants no satisfactory method of stabilising the starch suspensions, allowing them to be transported and stored without difficulty, has been developed and commercialised. There are clear problems in the way of such a development because any stabilising agent must be such that, whilst maintaining the starch in suspension, it also reacts rheologically in a manner which does not prevent or unduly hinder the suspension being pumped and passed through pipes.

The present invention is concerned, in one aspect, with the problem of stabilising starch suspensions and is thus potentially of great advantage, in the cereals-processing industry in particular.

The invention is also concerned with the use of stabilised starch suspensions in the manufacture of paper and board.

Use of a stabilised starch suspension according to the invention in paper or board making can be especially advantageous if the suspension contains a film-forming polymer which may be a cellulosic material. The stabilised starch suspension of the invention, whether or not containing a film-forming polymer, which may be a cellulosic material, may be added during the early stages of paper or board manufacture or may be added to the pulp itself and may assist web formation during those early stages of manufacture.

Introduction of a stabilised starch suspension according to the invention in the early stages in the formation of a paper web ("wet-end addition"), i.e. when the water content is reduced from about 99% to about 30%, ensures that the suspension is distributed more or less uniformly throughout the thickness of the paper or board. The suspension may also be applied to the formed web, on one or both surfaces thereof, in stages of manufacture subsequent to web formation, as the water content is reduced to between 2% and 20% by weight of the web.

"Size-Press Addition" may also be used to introduce additives in paper or board making, including solutions or dispersions of the additives, or foamed liquids, or dry powders. Whilst the size-press process is a useful method of applying substances to paper and board, large amounts of energy are needed to drive the machinery and to carry out the extra drying operations consequent on the use of a size press and the equipment is expensive to buy and install. Thus, when size-press addition is used to introduce solutions ior dispersions in water, it is necessary to arrange for extra drying equipment to be installed in addition to that used to dry the paper or board before it is passed through the size press. This extra drying requires up to 30% extra drying equipment and represents a further 30% increase in energy consumed during the manufacture of the paper or board.

The present invention which enables stabilised starch suspensions to be applied in a variety of ways and at a variety of stages of paper or board manufacture can be of significant advantage in the paper-making industry.

When dispersions of starch in water are subjected to high rates of shear, e.g. high rates of flow through restricted orifices such as those which are normally used to produce sprays, they exhibit considerable dilatancy, i.e. the apparent viscosity or resistance to flow increases as the rate of shear increases. The result of such increases is to restrict or stop flow. Dilatancy is particularly noticeable in suspensions of starch where the starch represents 5% or more of the total fluid and is familiar to those users of starch who wish to spray suspensions of raw or processed starch as aids to various industrial processes including application to paper and board during and subsequent to manufacture.

Aqueous dispersions of starch also tend to form sediments which are often the cause of failure of equipment. In order to prevent or reduce the occurrence of sedimentation, it has hitherto been customary to increase the viscosity of the suspension by raising the temperature of the starch above the temperatureat which the individual particles rupture; the process is generally referred to as "cooking". This enables the starch to hydrate, forming a gel which, by increasing the fluid viscosity, reduces the tendency of the starch particles to sediment. Alternatively, it is customary to add substances which, by raising the viscosity of the aqueous phase of the suspension, reduce the sedimentation process. Such viscosity-increasing substances include cold-water-soluble derivatives of starch or of cellulose and many high molecular weight polyhydric substances such as polyethylene oxide ethers, polyvinyl alcohols as well as "swelling clays" such as bentonite, attapulgite, "LAPONITE" and the like which are capable of raising the viscosity of the dispersion of starch in cold water.

However, such procedures as described above lead to poor spray formation since the fluids require high pumping pressures in order to achieve a sufficiently high degree of turbulence at the spray head to poduce the fine droplets that are desirable for application as herein described. Such high pumping pressures frequently lead to failure of equipment due to the inherent tendency of starch suspensions to become dilatant. The present invention enables these disadvantages to be overcome.

It is known from U.S. Pat. No. 3,692,552 to prepare stabilised laundry starch by adding powdered starch to an aqueous solution of xanthan gum or a water soluble derivative thereof. But this patent does not address the problem of stabilising an existing starch suspension and particularly of stabilising a starch suspension of the volume and in the condition to be expected of a by-product of cereals processing. Nor does the disclosure touch on the rheological problems of successful stabilisation of industrial starch suspensions.

European Patent Application No. 80300848 (Publication No. 0018 086) discloses the addition of xanthan gum to cooked or modified starch to prevent retrogradation. It is not directed to the problem of stabilisation of starch suspensions or the problem of transport and disposal of by-products of cereals processing.

SUMMARY OF THE INVENTION

According to one aspect of the ivention, a method of stabilising an aqueous suspension of uncooked starch comprises adding to the suspension a minor amount of a hydrophilic polymeric viscosity-increasing agent effective to prevent dilatancy and to increase the viscosity of the suspension so that settlement of starch particles during storage and transportation is substantially prevented, wherein said hydrophilic polymeric viscosity-increasing agent is such that in a 0.5% by weight aqueous dispersion or solution thereof (based on the total weight of the dispersion or solution) at 20° C. the shear stress at a shear rate of 1.0 reciprocal second is greater than 5 dynes/cm$^2$ and at a shear rate of 1000 reciprocal seconds is less than 250 dynes/cm$^2$.

A further aspect of the invention is a stabilised suspension comprising uncooked, never-dried starch and a minor amount of hydrophilic polymeric viscosity-increasing agent effective to prevent dilatancy and to increase the viscosity of the suspension so that settlement of starch particles during storage and transportation is substantially prevented, wherein said hydrophilic polymeric viscosity-increasing agent is such that in a 0.5% by weight aqueous dispersion or solution thereof (based on the total weight of the dispersion or solution) at 20° C. the shear stress at a shear rate of 1.0 reciprocal second is greater than 5 dynes/cm$^2$ and at a shear rate of 1000 reciprocal seconds is less than 250 dynes/cm$^2$.

One use for a stabilised starch suspension according to the invention is in the production of paper or board.

The preferred hydrophilic polymeric viscosity-increasing agent is the complex polymer obtained by fermentation of a suitable sugar-based medium by the organism *Xanthomonas campestris* and commonly known as xanthan gum.

The rheology of the suspension according to the invention is such that the suspension is rendered more pseudoplastic, whereby application to a paper web and other uses of the suspension are facilitated, since pseudoplastic (alternatively known as visco-elastic or shear-thinning) fluids as described in relation to this invention are capable of having sufficient viscosity to prevent sedimentation of dispersed starch particles under the low rates of shear experienced during storage or whilst the starch is being transported; yet, when subjected to high rates of shear such as occur when a fluid is expelled from a narrow orifice such as the nozzle of a spray jet, the same fluids exhibit sufficiently low viscosity to permit the formation of droplets suitable for the application of solutions or suspensions to paper or board during the early stages of manufacture and in other uses.

It has been found that it is advantageous to introduce into a starch suspension according to this invention a minor amount of a water-soluble film-forming polymer. One advantage of such an additive is that, should starch settle out of suspension, for example because the suspension has been diluted so as to bring the concentration of the hydrophilic polymeric viscosity increasing agent is too low a value for successful stabilisation, then it will be necessary to redistribute the settled-out starch in the suspension and it is believed that the presence of the film-forming polymer assists this process. Further, in paper-making applications of the stabilised starch suspension, the presence of the film-forming polymer enhances the properties of the paper produced.

The film-forming polymer may be nonionic or ionic. It may be the sodium, potassium or ammonium salt of a polycarboxylic acid in which the carboxylic units are attached to long-chain polyhydroxyl polymers, e.g. polysaccharides, whereof the polymers are based on glucose, mannose, galactose, pyranose, amylose and the like and their hybrid derivatives including such acids as glucuronic acid. Typical film-forming polymers which may be used include the sodium, potassium and ammonium salts of carboxymethyl starch, carboxymethyl cellulose and alginic acid, the water-soluble salts of polyacrylic acid and polymethacrylic acid and their homologues, and polyvinyl alcohol.

A stabilised starch suspension according to the invention may be applied to the surface of a paper by conventional, high-pressure sprays but it is preferred to use for such an application a spinning atomiser. Spinning atomisers are available in several similar forms and include devices sold under several registered trade marks, amongst them "MICRON MICROMAX" and "LELY HYDRASPIN". These atomisers and other similar ones comprise a truncated hollow conical shell set to spin on its vertical axis with the narrow end downwards.

BRIEF DESCRIPTION OF THE DRAWINGS

In the accompanying drawings:

FIG. 3 is a graph showing the relationship between apparent viscosity and shear rate for solutions of a number of hydrophilic polymeric viscosity-increasing agents.

DETAILED DESCRIPTION OF THE INVENTION

Figure 1:
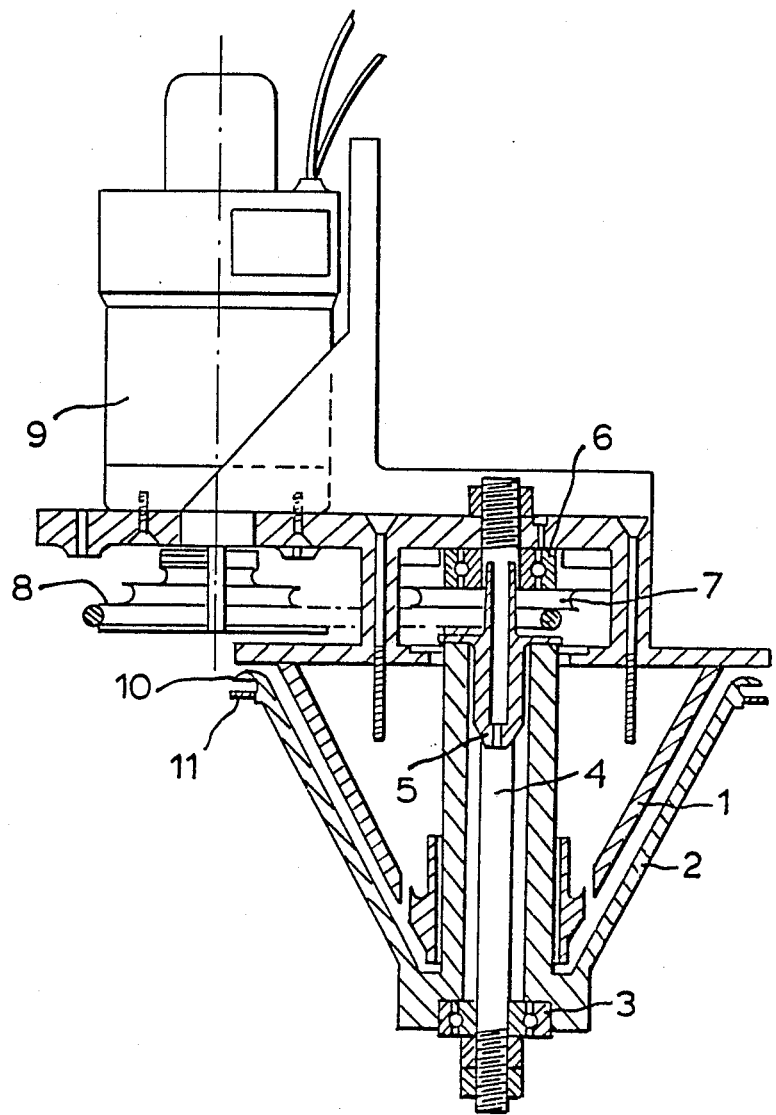
FIG. 1 is a sectional view of a rotary atomiser suitable for applying stabilised starch suspensions according to the invention in paper and board manufacture.

FIG. 1 shows a twin-cone system in a rotary atomiser. The atomiser comprises a fixed inner cone 1 surrounded by an outer cone 2 mounted on a bottom bearing 3 situated at the end of a central shaft 4. A central nozzle 5 is arranged to supply incoming fluid. The outer cone 2 is provided at the top with a top bearing 6 and drive means comprising a belt-driven pulley system 7,8 coupled with an electric motor 9. The upper outer edge of the outer cone 2 is provided with radial teeth 10 and a circumferential protecting ring 11. The fluid to be atomised is pumped through one or more ports into the interior of the spinning cone 2 and is subsequently carried upwards and outwards across the inner surface of the spinning cone 2 until it leaves the cone tangentially at its widest, upper circumference, that is at the teeth 10. The size of the droplets generated by this movement of the fluid is partly controlled by the form of teeth 10. The cones 1 and 2 may be driven by an electric or air or hydraulic motor through a suitable drive. In the case of a hydraulic motor, the driving energy may be transferred to the motor by means of a conventional hydraulic generator pump and specialised so-called "hydraulic fluid"; alternatively, the driving energy may be transferred by arranging for the starch suspension intended to be applied to the paper to drive a turbine connected to the spinning cones.

For a given atomiser and a suspension of given rheological properties and set spinning at a given speed of rotation, droplets of uniform size are generated. It follows that droplet size can be selected by choosing an appropriate combination of atomiser geometry, fluid rheology and speed of rotation in order to meet the particular requirements of the user. Each of the parameters governing droplet size may be adjusted independently of the others and also independently of the rate of flow of the starch suspension, whereas with a conventional spray nozzle the droplet size is dependent on the pressure drop across the nozzle which, in turn, governs the rate of flow. Since the droplets produced by the atomisers are of virtually uniform size, they follow similar trajectories, thus permitting a remarkably close degree of control of the pattern laid down on a paper surface and, hence, uniformity of application. If the droplets are ejected from a rotary atomiser set to spin on a vertical axis, they will travel in a horizontal trajectory; it therefore follows that they will each travel along a path determined (largely) by the resultant of the horizontal forces produced by the tangential motion and the force of gravity. If the body of the atomiser is placed so that the base of the cone is close to the surface to which the fluid is to be applied, it follows, in the case of an atomiser measuring 20 cm from its lower extremity to the level of the teeth 10, that the droplets will travel approximately 20 cm in the vertical direction under the force of gravity and so will be travelling very much more slowly than would similar droplets ejected at high velocity from a conventional pressure-operated spray nozzle. This is particularly advantageous when the fluid is to be applied to the surface of paper or board during the early stages of manufacture when the water content of the web is high and the strength of the web consequently low.

One or more atomisers may be fixed to a boom set so as to allow a starch suspension to be applied to the upper or lower sides of paper or board as it passes through the paper machine. If desired, part of the circumference of the spinning cone may be surrounded by a shield so as to restrict the passage of droplets to the space diametrically opposite the shield; this permits directional application of fluids to be made as and when required by the user. Fluid collected by the shield can be returned to the holding tank or into the fluid circulating system as may be convenient.

Turning now to the rheology of the starch suspensions to be applied by means such as spray nozzles or rotary atomisers, for optimum efficiency of a spray or atomising system it is necessary for the fluid to be in a state of turbulence at the point at which break-up into droplets occurs; in other words, optimum droplet formation occurs when the fluid viscosity is low. It therefore follows that, if two fluids of different viscosities are compared under similar conditions of flow as defined by the parameters used in the Reynolds Equation (below), better spray efficiency will be obtained in the fluid with the lower viscosity.

In order to achieve a stable starch suspension, the viscosity or resistance to deformation within the suspension should be as high as possible when the suspension is at or virtually at rest, i.e. under of low rates of shear. It is known that a starch suspension can be stabilised if its viscosity is raised by cooking at least part of the starch and thus preventing the starch particles from settling out under gravity. Stokes' Law illustrates this in that it shows that the forces exerted on suspended particles by external forces are inversely proportional to the viscosity of the suspension. However, cooking a starch suspension gives rise to high viscosities which are detrimental to the efficiency of spraying equipment. The solution proposed according to the present invention is that the rheology of the fluid in which the starch is suspended should exhibit a high viscosity at low rates of shear in order to prevent settlement of the starch particles and should exhibit low viscosity at high rates of shear in order to ensure sufficient turbulence during spraying to form droplets of optimum size and having optimum particle size distribution.

The viscosity of solutions of most polymeric substances falls off as the rate of shear or the rate of flow through a given orifice is increased. It is preferred, however, to consider values of shear stress in relation to corresponding values of shear rate in the present context since viscosity is a derived quantity and thus somewhat artificial concept in a context where shear stress varies in dependence upon shear rate. The relationship between viscosity (as normally calculated) and shear stress is an inverse relationship for solutions of polymers of the kind we are concerned with here (pseudoplastic solutions). See, for example Section 1.7 et seq. of "Well Design; Drilling and Production" by Craft, Holden and Groves, published by Prentice-Hall Inc. in 1962: Library of Congress Catalog Card No. 62-9949.

In Table IA, the shear stress in solutions in water of several well-known high-viscosity polymeric substances is compared over a range of shear rates; the respective viscosities and shear rates were measured with a Brookfield Synchrolectric Viscometer model RVT fitted with a concentric bob and cylinder attachment sold under the designation SC4 Small Sample Adapter or with a Baroid Rheometer 286. The two instruments produced a range of shear rates between 0.47 and 1020 reciprocal seconds. Shear rates and shear stresses were calculated from the manufacturer's data and the results (set out in Table IA) were used to draw the graph of FIG. 2 in which the shear stress in dynes/cm$^2$ is plotted on the y-axis against shear rate in reciprocal seconds on the x-axis using log-log graph paper.

By multiplying the experimental results set out in Table 1A by the appropriate factors given by the respective instrument manufacturers the results can be transformed into a relationship between shear rate and apparent viscosity. This operation has been carried out and the results are shown in Table IB.

The results of Table IB can be compared with similar measurements made on solutions of polymers at a concentration of 1% by weight of polymer on the toal weight of solution, the results of which measurements are shown in Table IC. The measurements in Table IC were made using only a Brookfield Viscometer as previously described.

It will be seen that the apparent viscosities of Table IC are all higher than those of Table IB due to the higher concentration of the polymer solutions tested to produce Table IC. Further, the requirement of a shear stress of more than 5 dynes/cm$^2$ at a shear rate of 1.0 reciprocal seconds and less than 250 dynes/cm$^2$ at a shear rate of 1000 reciprocal seconds in a solution of the concentration tested for Table IB corresponds, as can be seen from FIG. 3 in relation to the graph for xanthan gum, with a viscosity of more than 10,000 cps at a shear rate of 1 reciprocal second and a viscosity of less than 2000 cps at a shear rate of 10 reciprocal seconds in a solution of the concentration tested for Table IC. These comparisons are of significance in relation to the requirements for shear stress values at given shear rates of polymer solutions used in connection with this invention as will be made clearer below.

In Tables IA–IC which follow
XG denotes xanthan gum (Kelzan from Kelco-AIL Ltd)
SCMC H denotes high-viscosity sodium carboxymethylcellulose (F.1000 from Courtaulds Acetate Ltd)
MC M denotes medium-viscosity methylcellulose (Methocel J 12 MS from Dow Chemical Co. Ltd)
HEC H denotes high-viscosity hydroxyethylcellulose (100 MH from BP Chemicals Ltd)
GG denotes guar gum (Daicol 8005/C from Hercules Ltd)

TABLE IA

BROOKFIELD PVT SC-4
SHEAR STRESSES (dynes/cm$^2$)

| Polymer | Conc. (% w/w) of solution | Shear rate (sec-1) | | | | | | | |
|---|---|---|---|---|---|---|---|---|---|
| | | 0.47 | 0.93 | 2.33 | 4.65 | 9.3 | 18.6 | 46.5 | 93 |
| XG | 0.5 | 23.5 | 28.7 | 36.7 | 43.2 | 51.2 | 60.2 | 76.1 | 100.6 |
| XG | 0.35 | 8.5 | 11.8 | 15.5 | 19.7 | 24.0 | 28.7 | 38.1 | 45.0 |
| XG | 0.25 | 3.8 | 5.6 | 8.5 | 10.8 | 14.6 | 17.9 | 24.4 | 31.0 |
| SCMC H | 0.5 | 4.2 | 5.6 | 12.2 | 19.7 | 32.4 | 52.6 | 99.2 | |
| HEC H | 0.5 | | 3.3 | 8.0 | 15.0 | 24.9 | 40.9 | 73.3 | 108 |
| GG | 0.5 | | | 3.8 | 6.1 | 10.8 | 17.4 | 31.0 | 44.7 |
| MC M | 0.5 | | | | | 3.8 | 7.5 | 15.2 | 27.7 |
| Silicone liquid 300 centistokes | 100 | 2.3 | 4.4 | 8.5 | 18.3 | 36.7 | 77.4 | | |

BAROID RHEOMETER 286
SHEAR STRESSES (dynes/cm$^2$)

| Polymer | Conc. (% w/w) of solution | Shear rate (sec-1) | | | | | | | | |
|---|---|---|---|---|---|---|---|---|---|---|
| | | 5.1 | 10.2 | 20.5 | 43 | 85 | 170 | 340 | 510 | 1020 |
| XG | 0.5 | 46 | 51 | 61 | 66 | 81 | 92 | 112 | 122 | 199 |
| | 0.35 | | | 26 | 36 | 41 | 51 | 66 | 77 | 102 |
| | 0.25 | | | | 20 | 26 | 35 | 46 | 61 | 82 |
| SCMC H | 0.5 | 26 | 41 | 61 | 92 | 138 | 215 | 307 | 388 | 521 |
| HEC H | 0.5 | | 26 | 46 | 72 | 97 | 138 | 199 | 240 | 317 |
| GG | 0.5 | | | 20 | 31 | 41 | 61 | 87 | 107 | 148 |
| MC M | 0.5 | | | | 25 | 31 | 56 | 87 | 118 | 189 |
| Silicone liquid 300 centistokes | 100 | | 41 | 82 | 168 | | | | | |

TABLE IB

BROOKFIELD RVT SC-4
VISCOSITIES (cps)

| Polymer | Conc. (% w/w) of solution | Shear rate (sec-1) | | | | | | | |
|---|---|---|---|---|---|---|---|---|---|
| | | 0.47 | 0.93 | 2.33 | 4.65 | 9.3 | 18.6 | 46.5 | 93 |
| XG | 0.5 | 23500 | 14350 | 7340 | 4320 | 2560 | 1505 | 760 | 500 |
| XG | 0.35 | 8500 | 5900 | 3100 | 1970 | 1200 | 720 | 380 | 225 |
| XG | 0.25 | 3800 | 2800 | 1700 | 1080 | 730 | 450 | 240 | 155 |
| SCMC H | 0.5 | 4200 | 2800 | 2440 | 1870 | 1620 | 1315 | 990 | 775 |
| HEC H | 0.5 | | 1650 | 1600 | 1500 | 1245 | 1020 | 730 | 540 |
| GG | 0.5 | | | 760 | 620 | 540 | 435 | 310 | 220 |
| MC M | 0.5 | | 275 | | 220 | 190 | 190 | 150 | 140 |
| Silicone liquid 300 centistokes | 100 | 2300 | 2200 | 1700 | 1830 | 1835 | 1860 | 1880 | 1870 |

BAROID RHEOMETER 286
VISCOSITIES (cps)

| Polymer | Conc. (% w/w) of solution | Shear rate (sec-1) | | | | | | | | |
|---|---|---|---|---|---|---|---|---|---|---|
| | | 5.1 | 10.2 | 20.5 | 43 | 85 | 170 | 340 | 510 | 1020 |
| XG | 0.5 | 4600 | 2560 | 1535 | 795 | 490 | 275 | 170 | 125 | 100 |
| | 0.35 | | | 640 | 432 | 254 | 155 | 100 | 80 | 50 |
| | 0.25 | | | | 245 | 155 | 105 | 70 | 60 | 40 |
| SCMC H | 0.5 | 2600 | 2050 | 1525 | 1105 | 830 | 645 | 460 | 390 | 260 |
| HEC H | 0.5 | | 1300 | 1150 | 865 | 580 | 415 | 300 | 240 | 160 |
| GG | 0.5 | | | 500 | 370 | 245 | 185 | 130 | 105 | 75 |
| MC M | 0.5 | | | | 300 | 185 | 170 | 130 | 120 | 95 |
| Silicone liquid 300 centistokes | 100 | | 2050 | 2050 | 2015 | 2020 | 2050 | 1920 | | 1910 |

TABLE IC

| Polymer | Shear rate (sec-1) | | | | | | | |
|---|---|---|---|---|---|---|---|---|
| | 0.5 | 0.9 | 2.3 | 4.7 | 9.3 | 18.6 | 46.5 | 93.0 |
| | Viscosity (centipoises) at 20 deg. C. | | | | | | | |
| SCMC H | 18000 | 13000 | 8400 | 6000 | 4300 | 3000 | 1900 | 1400 |
| HEC H | 8000 | 6500 | 5000 | 3800 | 2700 | 1900 | 1100 | |
| GG | 11000 | 9100 | 5800 | 3900 | 2400 | 1500 | 700 | |
| XG | 32000 | 17000 | 7500 | 3800 | 1900 | 1100 | 450 | 240 |
| MC M | 660 | 550 | 480 | 430 | 400 | 340 | 260 | 210 |

The velocity at which a fluid changes from laminar or quiescent flow to turbulent flow is defined by the Reynolds Equation expressed as follows:

$$Nr = \frac{d \cdot v \cdot r}{V} \cdot K$$

Where
 Nr=the Reynolds number of the fluid
 d=the density of the fluid
 v=the velocity of the fluid
 r=radius of the pipe or orifice through which the fluid is flowing
 K=a proportionality constant
 V=the viscosity of the fluid If the above parameters are expressed in C.G.S. units, turbulence occurs when the Reynolds Number exceeds 2000. It can be seen that, if the value of V (the viscosity) for a particular fluid is low, the Reynolds Number will be high, and turbulence will occur in conditions in which a fluid of higher viscosity would flow in a laminar manner; additionally, the low viscosity will enable the fluid to flow at a higher velocity under given circumstances and further increase the Reynolds Number and, hence, the turbulence of the fluid.

If the fluid is flowing through a pipe or orifice and has a density of d gm/cm$^3$, the fluid velocity will be Q/A where Q=rate of flow in cm$^3$/s and A=area of cross section of the pipe or orifice in cm$^2$.

Hence the Reynolds equation can be expressed as:

$$Nr = \frac{d \cdot Q \cdot r}{A \cdot V} \cdot K$$

But d·Q is the mass of fluid flowing through the orifice or past a point in the pipe each second and therefore for a given pipe or orifice and a given flow rate in terms of mass of fluid flowing per second, $$Nr = K' \cdot \frac{1}{V}$$

where K' is a constant. That is, the tendency towards turbulent flow and hence atomisation varies inversely with the viscosity of the fluid.

The viscosity V in poise can be calculated at a given shear rate from the equation:

$$V = C \times \frac{S}{D}$$

where
 S=shear stress in dynes/cm$^2$,
 D=shear rate in reciprocal seconds,
 C=a constant Thus, a low value of S corresponds to an increased tendency to turbulence and atomisation.

Figure 2:
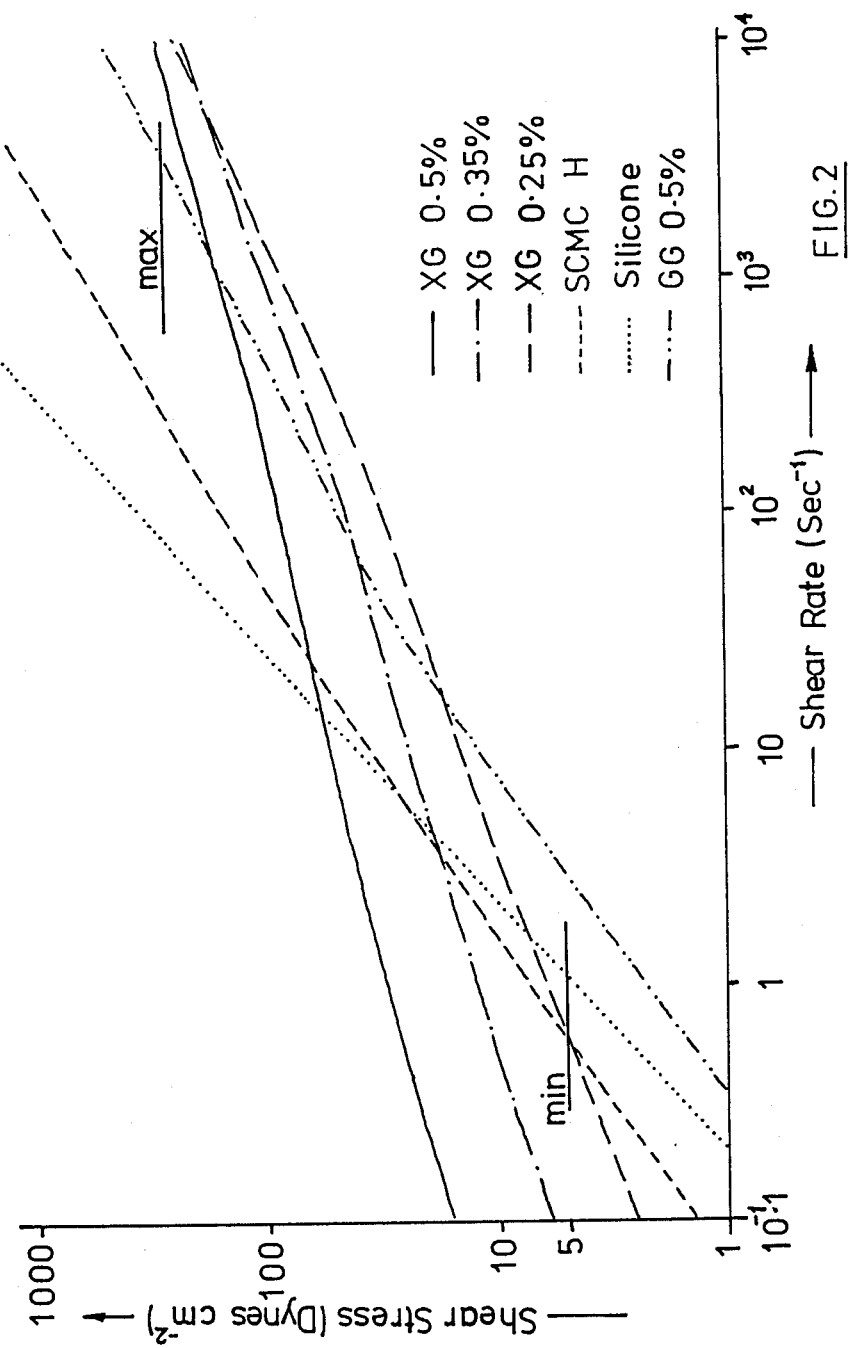
FIG. 2 is a graph showing the relationship between shear stress and shear rate for solutions of a number of hydrophilic polymeric viscosity-increasing agents.

It can be seen from the graphs of FIG. 2 that xanthan gum solutions combine high values of S at low values of D and low values of S at high values of D. Thus a 0.5% solution of xanthan gum in water has a shear stress greater than 5 dynes/cm$^2$ at a shear rate of 1 reciprocal second. This value is judged to be the lowest reasonable value for shear stress at a shear rate of 1 reciprocal second in a 0.5% solution (by weight of polymer in the total weight of solution) for a polymer which will stabilise a starch solution adequately, and at reasonable concentrations. Further, this value is exceeded only by xanthan gum and SCMC H of the polymers tested.

To determine the ability of the polymers to stabilise starch solutions, a sedimentation test was carried out. Starch known as Tenstar AB manufactured by Rank Hovis MacDougall Ltd. was made up into an aqueous slurry comprising 38% solids and diluted to 20% solids to expedite sedimentation. Samples of the diluted slurry were treated by adding to them the polymers listed in Table II in quantities sufficient to produce a concentration of polymer in the treated slurry as shown in Table II where the percentage of polymer shown is the percentage of the polymer by weight in the total weight of the treated starch slurry. The treated suspensions were placed in glass cylinders to a depth of 24 cm in each case and kept stationary for 336 hours (14 days) at a temperature of 20° C. The depth of clear liquid above the opaque sediment which formed in most cases was measured at intervals with the results shown in Table II.

TABLE II

| Stabilising Polymer | % concentration (by weight) | Depth of clear liquid cm at: | | | |
|---|---|---|---|---|---|
| | | 24 hr | 48 hr | 168 hr | 336 hr |
| Xanthan gum | 0.5 | 24 | 24 | 24 | 24 |
| | 0.35 | 24 | 24 | 24 | 24 |
| | 0.25 | 24 | 24 | 24 | 24 |
| | 0.15 | 24 | 23 | 19 | 16 |
| SCMC H | 1.0 | 24 | 23 | 21 | 18 |
| | 0.5 | 20 | 15 | 15 | 15 |
| SCMC L | 5.0 | 18 | 16 | 12 | 12 |
| HEC H | 1.0 | 18 | 15 | 13 | 12 |
| Guar gum | 1.0 | 24 | 23 | 12 | 14 |
| MC M | 1.0 | 16 | 14 | 12 | 12 |

(SCMC L = low viscosity sodium carboxy methyl cellulose)

Xanthan gum, even at a concentration by weight of 0.25%, maintains the starch suspension free from sedimentation for 336 hours. SCMC H allows some sedimentation after 48 hours but is judged to give sufficient protection from sedimentation to make its use, especially at a concentration of 1.0% by weight and just about at a concentration of 0.5% by weight, a reasonable commercial proposition.

Thus, the two polymers tested which show a shear stress greater than 5 dynes/cm$^2$ at a shear rate of 1 reciprocal second are found in the case of xanthan gum to provide a perfectly satisfactory stabilising agent and in the case of SCMS H to provide an adequate stabilising agent. Therefore, it is concluded that to serve as a stabilising agent for starch suspensions under the commercial conditions envisaged in the present context a hydrophilic polymeric viscosity-increasing agent should show a shear stress in excess of 5 dynes/cm$^2$ at a shear rate of 1 reciprocal second and advantageously shows a shear stress in excess of 10 dynes/cm$^2$ and, better, in excess of 20 dynes/cm$^2$.

To test the resistance of starch suspensions with added polymers to pumping and their ability to atomise adequately under normal conditions, some of the suspensions of starch with added polymers listed in Table II (that is diluted to a 20% solid starch content by weight) were pumped through an atomiser as described in U.K. Patent Specification No. 2,004,206B by means of a gear pump delivering 3 liters per minute at pressures up to 120 psi (827.6 kPa). The pressure required to pump each suspension at a rate of 3 liters per minute was measured and the atomisation if any, was noted. The results are shown in Table III.

TABLE III

| Stability polymer or water control | Pressure (psi) | Atomisation |
|---|---|---|
| water | 10 | Fine droplets: even pattern |
| xanthan gum (0.5% by weight) | 20 | Fine droplets: even pattern |
| SCMC H (1.0% by weight) | 120 | No atomisation |
| SCMC L (5.0% by weight) | 60 | No atomisation |

Table III shows that the resistance to pumping and atomisation of the solution of SCMC H is considerably higher than that of the xanthan gum solution. The SCMC L solution shows better results in Table III but is not judged satisfactory for applications envisaged for the present stabilised starch suspensions. Xanthan gum does perform satisfactorily and is characterised, in respect of the pumpability and atomisation properties by a shear stress below 250 dynes/cm$^2$ at a shear rate of 1000 reciprocal seconds. The guar gum solution also fulfils this criterion but its stabilising powers are inadequate (see Table II). It is therefore judged that the hydrophilic polymeric viscosity increasing agent used to stabilise starch suspensions according to the present invention should, when made up into a 0.5% aqueous solution, by weight, produce a solution having a shear stress of less than 250 dynes/cm$^2$ at a shear rate of 1000 reciprocal seconds. Preferably the shear stress is less than 200 dynes/cm$^2$ at that shear rate.

Thus, the present invention is based on the discovery that if xanthan gum or another hydrophilic viscosity-increasing polymer having rheological properties satisfying the criteria mentioned above is added to a starch suspension either directly or by mixing with the starch powder, it renders the aqueous suspension capable of being stored for prolonged periods without significant sedimentation. Suspensions thus stabilised can be passed through restricted orifices without giving rise to dilatancy and can be readily transformed into droplets of sufficiently small size to enable them to be used as a means of applying starch uniformly to surfaces including surfaces of paper during manufacture.

The preferred polymer for modifying the rheology of starch suspensions in this way is xanthan gum but similar polysaccharides capable of dissolving in water to produce solutions possessing high viscosity (compared with other polymers) at low rates of shear but low viscosity (compared with other polymers) at high rates of shear as illustrated in Table I could be used. Solutions of xanthan gum show little variation in their physical properties, including rheology, over temperature ranges normally experienced in paper mills and other closed industrial premises; these properties also show negligible variations when ionic and other dissolved substances are present with the xanthan gum. This is especially important when water of unknown composition is used to prepare a starch suspension, e.g. when recycled water or differing degrees of hardness or with differing salt contents and at varying temperature is used in such preparations.

As the sedimentation test described above illustrates, xanthan gum in a suspension of starch greatly reduces the tendency of starch particles to settle out or form intractable sediments and thus allows users to store such suspensions for prolonged periods and to transport the starch in the form of a slurry to its eventual destination without the necessity to install special agitation equipment in the slurry containers used for transport and storage of the slurry. The convenience of being able to transport and store starch suspensions by adding xanthan gum to them is particularly important in that such suspensions are available as residues produced in certain food-manufacturing processes. It is economically advantageous to be able to supply the starch in the form of a slurry rather than to extract and dry the starch and subsequently to have to remake the suspension before use. This invention thus provides an economic method of storing and transporting such starch suspensions or slurries to the benefit of the starch and paper industries.

Starch suspensions according to the invention have a reduced tendency (compared with untreated starch suspensions) to exhibit the phenomenon of dilatancy which can be best described as a rise in viscosity or resistance to flow as the rate of shear increases. Dilatancy is a condition to be avoided in handling starch and other suspensions since dilatant fluids tend to cease flowing under conditions of high rates such as occur inside pumps and control valves, restrictions and bends in pipes and in the nozzles of conventional spraying equipment. Therefore, the presence of xanthan gum in such suspensions serves to reduce the troublesome tendency of suspensions to cause blockages in the equipment used to carry them and, particularly, in the nozzles of conventional spray equipment.

The amount of xanthan gum preferably lies between about 0.25% and about 1.0% by weight on the weight of water in the suspension. In the case of suspensions prepared from dried, powder starch, the xanthan gum or other suitable hydrophilic viscosity-increasing agent can be incorporated in the starch powder, together with such other polymeric substances as may be deisred, so as to be present in the aforementioned proportions in the slurry prepared from the starch powder. In the case of starch already in suspension form, for example in the form of a never-dried suspension which may be a product or by-product of an industrial process, it is convenient to add the xanthan gum soon after production of the starch suspension in order to facilitate transport and prolonged storage.

It can be advantageous to add to a starch suspension, in addition to a hydrophilic viscosity-increasing agent, certain polymers with film-forming properties when dissolved or otherwise dispersed in water and applied to a surface in droplet form in a manner similar to that already described for the application of starch suspensions to paper or board during manufacture. The preferred film-forming polymers are polysaccharides such as the sodium, potassium and ammonium salts of carboxylmethyl starches or of carboxymethyl celluloses or of alginic acid or the water-soluble salts of polyacrylic acid, and polymethacrylic acid and their homologues, and polyvinyl alcohol. Commonly, the sodium salt of carboxymethyl cellulose, known as SCMC or CMC, is used.

The carboxymethyl celluloses used as film-forming polymers in the present context can have a degree of carboxymethylation of from 0.35 to 1.4 (related to the three labile hydroxy groups theoretically available for substitution in each anhydroglucose ring within the cellulose molecule chain). They can also have total molecular weights from 15,000 to 800,000, preferably 50,000 to 250,000.

The amount of film-forming polymer or mixture of film-forming polymers added to a starch suspension for the present purposes can vary up to a concentration of 10% by weight on the weight of the water in the starch suspension but is more usually 0.25% to 7.5% by weight of the water content of the starch suspension.

The presence of xanthan gum (or a polymer with similar rheological properties) as part of an aqueous suspension of starch applied to the surface of a paper web increases the resistance to flow of the suspension at low flow rates and thus serves to reduce the rate at which the suspension penetrates the paper web after application. It follows, therefore, that the presence of xanthan gum will keep the suspension at or close to the surface of the paper web even when the paper web contains a high proportion of water such as occurs during the early stages of paper manufacture.

Advantageously, a stabilised starch suspension according to the invention may be applied to paper or board so that the starch content represents from 0.5% to 10% of the weight of the dried paper.

A stabilised starch suspension and a solution of a film-forming polymer may be applied separately, for example through two or more atomising distributors arranged to apply the suspension and solution at the most appropriate points, in a paper or board-making process.

Paper or board treated withh a stabilised starch suspension according to the invention containing a film-forming polymer has been shown to have increased strength and improved surface qualities, as described below in the Examples given, which make it a more valuable commodity.

The invention will be further described with reference to the following Examples.

EXAMPLE 1

Rheological Effect of Xanthan Gum in a Starch Suspension (Suspension Stability)

(a) 38% Starch Solids Slurry 250 ml quantities of a commercial starch slurry known as Tenstar AB manufactured by Ranks Hovis MacDougall Ltd., containing 38% by weight of wheat starch solids were treated with several addition of xanthan gum. The amount of settlement or sedimentation of the starch was judged by noting the volume of clear liquid appearing in the upper part of the liquid when stored in a 250 ml graduated glass cylinder over a period of several days. The results were noted and shown in Table IV below. (This example is similar to the experiments conducted to amass data for Table II.)

TABLE IV

| Percent Xanthan Gum (on total volume) | 38% Tenstar Starch Slurry Volume of Clear Liquid (ml) | | | |
|---|---|---|---|---|
| | 1 day | 3 days | 7 days | 14 days |
| 0.0 | 0 | 5 | 10 | 25 |
| 0.10 | 0 | 0 | 5 | 10 |

TABLE IV-continued

| Percent Xanthan Gum (on total volume) | 38% Tenstar Starch Slurry Volume of Clear Liquid (ml) | | | |
|---|---|---|---|---|
| | 1 day | 3 days | 7 days | 14 days |
| 0.15 | 0 | 0 | 0 | 0 |
| 0.20 | 0 | 0 | 0 | 0 |

(b) 18% Starch Solids Slurry

The procedure described in Example 2(a) was repeated with another commercial starch slurry known as Staper Starch, containing 18% by weight starch solids. The results are shown in Table V.

TABLE V

| Percent Xanthan Gum (on total volume) | Volume of Clear Liquid (ml) | | | |
|---|---|---|---|---|
| | 1 day | 3 days | 7 days | 14 days |
| 0.0 | 120 | 140 | 170 | 180 |
| 0.10 | 50 | 70 | 110 | 150 |
| 0.15 | 20 | 40 | 60 | 70 |
| 0.20 | 0 | 0 | 0 | 0 |

(Notes: The slurries used in the above experiments were treated with 0.2% by weight dichlorodiphenylmethane (dichlorophen) in order to prevent microbiological interference with the starch and polymer dispersions).

The results of the above experiments confirm that xanthan gum addition to commercial slurries of starch has the beneficial effect of preventing settlement of the starch and so provides the benefit of long-term storage without the necessity for continuous agitation.

EXAMPLE 2

(a) Effect on Strength of Hand Made Paper

Blends of starch combined with sodium carboxylmethyl cellulose (SCMC) and/or xanthan gum were prepared as shown in Table VI, in which the figures are parts by weight.

TABLE VI

| BLEND | Starch | SCMC DS 0.65 | SCMC DS 0.85 | Xanthan Gum |
|---|---|---|---|---|
| A | 100 | 0 | 0 | 0 |
| B | 96 | 4 | 0 | 0 |
| C | 96 | 0 | 4 | 0 |
| D | 99.6 | 0 | 0 | 0.4 |
| E | 95.6 | 0 | 4 | 0.4 |
| F | 95.6 | 4 | 0 | 0.4 |

(DS denotes degree of substitution)

250 grammes of each blend were mixed into 750 ml water so as to form 25% w/v slurries which were used to spray on to hand-made paper as it was being formed. The spray was arranged so as to deliver 0.7 ml on each occasion, which, on paper sheets of nominal 3.7 dry weight, is equivalent to 4.7% add-on of dry starch or blend to dry paper.

The paper furnish was bleached kraft with retention aid. After drying and calendering, the sheets of paper were tested for burst strength with a Mullen Tester. The mean of 10 tests was recorded and compared with untreated paper made at the same time but sprayed with water in place of the starch slurry. The results are shown in Table VII.

TABLE VII

| Bleached kraft; 3.7 g sheets; 4.7 wt. % starch add-on | | |
|---|---|---|
| BLEND | Mullen Burst (psi) | % Change |
| NIL | 14.2 | 0.0 |
| A | 15.7 | +10.5 |
| B | 16.5 | +16.5 |
| C | 17.0 | +19.7 |

TABLE VII-continued

Bleached kraft; 3.7 g sheets; 4.7 wt. % starch add-on

| BLEND | Mullen Burst (psi) | % Change |
|---|---|---|
| D | 17.0 | +19.7 |
| E | 17.2 | +21.1 |
| F | 17.5 | +23.2 |

The results of the experiments shown in Table VII illustrate the beneficial effects of increasing the bursting strength of paper by adding starch; they further show the additional benefits derived from the addition of small proportions of film-forming polymers to the starch as described in this invention. The additional costs of making these additions are greatly outweighed by the commercial advantages to be gained.

EXAMPLE 3

Use of Atomising Distributor

An atomiser as described above was set above the wire part of a Fourdrinier paper-making machine so as to distribute a slurry prepared by dilution of a commercial starch slurry into which had been introduced SCMC and xanthan gum immediately following manufacture of the slurry as a by-product of a process to extract other components of milled wheat i.e. the addition of the SCMC and xanthan gum was made to never-dried starch. The proportions of materials used in this Example:

Starch Slurry

| Wheat starch solids | 380 kg |
|---|---|
| SCMC | 28 kg |
| Xanthan gum | 2 kg |
| Water | 600 kg |

The paper-making machine was set to produce 40 kg of paper per minute of a weight of 35 persquare meter at a speed of 400 m per minutes. The paper-making furnish comprised selected waste plus bleached kraft and initially contained 1.5% (dry basis) of a commercial cationic starch acting partly to provide the required burst strength and partly to aid drainage as well as retention of fibres on wire part of the machine. Slurry of the above composition was pumped through a flowmeter at 1.5 liters per minute, representing 0.57 kg starch solids per minute, i.e. 1.4% of the paper dry weight. The slurry passed through an in-line diluter in which it was mixed with water separately pumped at 5 liters per minute. The resultant 6.5 liters per minute of diluted slurry was passed through an atomiser as described above driven by an air motor set to run at 5000 revolutions per minute producing droplets of 500 micrometers mean diameter.

The slurry was applied to the paper over a 30 hour period, samples being taken at intervals. During the period, the cationic starch addition to the furnish was progressively reduced to zero in order to compare use of a stabilised starch suspension according to the invention containing SCMC and applied by means of a rotary atomiser to the paper surface with addition of a conventional starch to the furnish.

Samples of the paper off the end of the Fourdrinier machiner were removed and subjected to tests to determine the Mullen Burst Ratio (MBR), and tensile strength. The results are shown in Table VIII.

TABLE VIII

Furnish: 50 g/sq. meter; 1.4 wt. % starch suspension add-on through atomiser.

| SAMPLE | MULLEN BURST RATIO (MBR) | % CHANGE IN MBR | TENSILE STRENGTH (psi) | % CHANGE in tensile strength |
|---|---|---|---|---|
| | Cationic starch in furnish 1.5% | | | |
| Blank (No suspension add-on) | 2.80 | 0.0 | 56 | 0.0 |
| A | 3.20 | +14 | 57 | +1.8 |
| | Cationic starch in furnish reduced to 0.8% | | | |
| B | 3.41 | +22 | 60 | +6.7 |
| C | 3.36 | +20 | 62 | +9.7 |
| D | 3.33 | +19 | 59 | +5.4 |
| | Cationic starch in furnish to zero | | | |
| E | 3.46 | +24 | 56 | 0.0 |
| F | 3.52 | +26 | 56 | 0.0 |

*the parameter "Mullen Burst Ratio" (MBR) is defined as:-

$$MBR = \frac{MB}{GSM}$$

where: MB = the pressure in pounds per square inch required to burst a sample of paper in the well-known Mullen Tester used throughout the paper-making industry.
GMS = the weight in grammes of one square meter of paper.

Thus, the "Mullen Burst Ratio" can be used to eliminate minor variations in paper weight which would otherwise affact the results of the burst test.

The results show that a starch suspension according to the invention and containing SCMC when applied to a surface of a paper web on the Fourdrinier machine increased the burst strength of paper already containing a strength-increasing additive in the form of cationic starch; furthermore, the Mullen Burst Strength Ratio increased additive (cationic starch) was progressively reduced to zero. Therefore the addition of a starch suspension according to the invention applied in the form of small droplets to paper during production on a paper-making machine can produce better results than a conventional type of starch added to the furnish and hitherto regarded as acceptable by those skilled in the art of manufacturing paper.

By adjusting the position of the atomiser along the wire part of the paper-making machine it is envisaged that the degree of penetration of the stabilised starch suspension applied may be controlled. For example, applying the starch suspension at positions where the water content of the paper is high allows the starch suspensions to penetrate the body of the paper and so become an integral part of the paper; conversely, application at points where the water content has been reduced by drainage, suction or the application of heat allows the starch suspension to be held at the surface of the paper and so become concentrated at or near the surface.

What is claimed is:

1. In a process for manufacture of paper or board in which a starch suspension is applied to the paper or board, the improvement which comprises applying to a surface of said paper or board an aqueous suspension comprising (a) uncooked starch, (b) a minor amount of xanthan gum effective to prevent dilantancy and to increase the viscosity thereof substantially to prevent settlement of starch particles during storage and transportation of said suspension, and a minor amount of a water-soluble polymer having the property of forming a film on application of said suspension to paper or board.

2. A process according to claim 1 in which said water-soluble polymer is selected from the group consisting of the sodium, potassium and ammonium salts of carboxymethyl starch, carboxymethyl cellulose and alginic acid, the water-soluble salts of polyacrylic acid, polymethacrylic acid and their homologues, and polyvinyl alcohol.

3. A process according to claim 2 in which said suspension contains xanthan gum in an amount of from about 0.25 to about 1.0 percent by weight of the water in said suspension.

4. A process according to claim 2 in which said suspension contains said film-forming polymer in an amount of from about 0.25 to about 7.5 percent by weight of water in said suspension.

5. A process according to claim 4 in which said film-forming polymer comprises sodium carboxymethyl cellulose having a degree of carboxymethylation of from about 0.35 to about 1.4 and a molecular weight of from about 15,000 to about 800,000.

* * * * *